United States Patent [19]

Raymond

[11] Patent Number: 4,577,797

[45] Date of Patent: Mar. 25, 1986

[54] APPARATUS AND METHOD FOR MAKING LAMINATE STRUCTURES

[75] Inventor: Roger S. Raymond, Redondo Beach, Calif.

[73] Assignee: Rockwell International Corporation, El Segundo, Calif.

[21] Appl. No.: 592,044

[22] Filed: Mar. 21, 1984

[51] Int. Cl.⁴ .............................................. B23K 1/20
[52] U.S. Cl. .................................... 228/118; 228/157
[58] Field of Search ................ 228/157, 118, 4.5, 44.7

[56] References Cited

U.S. PATENT DOCUMENTS 4,315,128  2/1982  Matcovich et al. ................. 228/4.5
4,331,284  5/1982  Schulz et al. ....................... 228/118

Primary Examiner—Nicholas P. Godici
Assistant Examiner—Samuel M. Heinrich
Attorney, Agent, or Firm—Charles T. Silberberg

[57] ABSTRACT

An improved apparatus and forming method is disclosed for making laminate structures from a stack of worksheets using superplastic forming and diffusion bonding. A fluid line is inserted into the forming die which is connected to the stack by a slot in one sheet. A sheet is coated with a stopoff material to prevent bonding of selected areas of the sheets. The slot is positioned adjacent to the stopoff path and an inflation tube having an internal bore is inserted into the slot. The tube material is noncontaminating relative to the worksheet materials, and the tube material has a high compressive strength sufficient to form a groove in one worksheet without diminishing the bore area. When the tube is thicker than the sheet having the slot in it and the tube is subjected to compressive forces by the forming die, the tube acts as a male die and pushes out a groove in a surrounding worksheet without substantially changing the structure of the tube. Gas is fed into the fluid line, and into the stack of sheets creating a pressure differential within the stack for diffusion bonding and superplastic forming.

13 Claims, 1 Drawing Figure

APPARATUS AND METHOD FOR MAKING LAMINATE STRUCTURES

BACKGROUND

The invention relates to superplastic forming and diffusion bonding and particularly to an improved apparatus and method for making laminate structures from a plurality of worksheets.

"Superplasticity" is the property of a material to develop unusually high tensile elongations with a reduced tendency toward necking. This property is only exhibited by a limited number of metals. Titanium and its alloys, and certain aluminum alloys are examples of metals that exhibit superplasticity.

The process of superplastic forming and diffusion bonding has been disclosed in U.S. Pat. No. 3,927,817 by Hamilton et al., entitled "Method for Making Metallic Sandwich Structures", which is incorporated into this specification by reference. Generally, the patent discloses a method of making diffusion bonded and superplasticity formed sandwich structures. The forming tool includes a first fluid line and the stacked worksheets include a second fluid line. The worksheets are coated with a stopoff material in selected areas that are not to be diffusion bonded. The uncoated areas of the stacked worksheets are diffusion bonded together by applying a pressure differential, and at least one of the blanks is superplastically formed against at least one of the die surfaces forming a sandwich structure. Expansion tubes are inserted into a recess in the stack and are used to insure even gas flow into the worksheets during superplastic forming.

Considerable time is required to make the recess and to install the expansion tubes. The tubes are typically made of steel and the high diffusion bonding and superplastic forming pressures may crush the bore in the expansion tube.

U.S. Pat. No. 4,331,284 by Schulz et. al., entitled "Method of Making Diffusion Bonded and Superplastically Formed Structures", which is also incorporated into this specification by reference, discloses a method of simplifying the tooling. A hollow tubular member is inserted into the stacked worksheets and coupled to the pressurized inert gas line. The member extends to the stopoff path, thereby eliminating the need for the expansion tubes and the recess in the stacked sheets. However, this latter approach imposes some other problems. The worksheets are preferably Ti-6Al-4V, and when steel tubular members are used, the nickel in the steel tubes reacts with the titanium in the worksheets causing contamination in the interior surface of the formed part. While the expansion tubes are easily removed from the formed structure, the hollow tubes are not and the contamination problem is extended. In addition, when the hollow tube is thicker than the core worksheet, grooves are needed in the bottom forming die and in the bottom face sheet that is positioned under the hollow tube. The grooves allow the hollow tube to fit into the core sheet while minimizing the compressive forces applied to the hollow tube. However, the grooves unduly complicate the forming process, and require precise worksheet alignment. The face sheet groove is removed by subsequent machining.

U.S. Pat. No. 4,304,350 by Paez et. al., entitled "Method of Pressurization System For Superplastic Forming and Diffusion Bonding" discloses yet another system for forming laminate structure by superplastic forming and diffusion bonding. A hollow stainless steel pin is inserted into a recess in one die member and into an opening in the bottom face sheet perpendicular to the sheet. The needle is a complex shape requiring additional machining within tight tolerances. The tooling design is further complicated when three or more worksheets are involved. Also, a stainless steel pin can cause contamination.

A new forming apparatus and method is needed for forming sandwich structures using superplastic forming and diffusion bonding which overcomes the disadvantages of the prior art.

SUMMARY

It is the primary object of the present invention to provide a new, improved forming apparatus and method for making laminate structures by superplastic forming and diffusion bonding.

It is another object of the present invention to eliminate fluid lines affixed to the worksheets used in diffusion bonding and superplastic forming laminate structures.

It is yet another object of the present invention to eliminate the grooves in the face sheet and the forming die that are required when the inflation tube is thicker than the worksheet.

It is yet another object of the present invention to provide an inflation tube that not only is noncontaminating relative to the worksheet materials, but also has a high compressive strength so that the tube bore will not close during high pressures.

The invention is an improved forming apparatus and method for making laminate structures. Although, the present invention may be used to form non-metallic materials such as plastics, the discussion below primarily involves metallic structures.

In the present invention when three worksheets are used, the sheets are positioned in a stack between two forming dies. One forming die is connected to a fluid source, preferably an inert gas such as argon, which provides a flow path through the die and into the stack. Apertures in the sheets provide a continuous internal fluid path. A stopoff material is selectively applied between the second and third sheets in the areas not to be diffusion bonded. The first sheet, adjacent to the forming die connected to the fluid source, has a port therein and the second sheet has a slot therein, so that the fluid flows through the fluid line in the die, into the port, and through the slot to the stopoff path. To assure that the slot is not crushed during diffusion bonding and superplastic forming, a ceramic inflation tube having a compressive strength of at least about 3000 psi, is inserted therein. The ceramic material, preferably alumina (aluminum oxide), is noncontaminating with respect to the sheet material, which is preferably Ti-6Al-4V. The alumina is also noncontaminating relative to aluminum. The sheets may also be of different material, i.e. where only one sheet is to be superplastically formed (requiring superplastic characteristics). The metal sheet materials, however, must be compatible for bonding. Also, the alumina has a compressive strength of about 300,000 psi, which is more than sufficient to withstand high preforming and forming pressures.

A seal is provided between the port in the first sheet and the upper die member. During forming a differential pressure is applied to the stack, and sufficient heat is applied to form a laminate structure.

The inflation tube eliminates the need to insert a groove in the second die and a matching groove in the adjacent face sheet prior to forming. If the inflation tube is thicker than the core sheet, the groove in the face sheet will be made during forming, without diminishing the size of the bore in the inflation tube. The tube acts as a male die and pushes out a groove in the surrounding worksheet.

The present invention can be used to form two sheet laminates. The stopoff material is selectively applied between the two sheets. A continuous fluid path between the sheets is needed. An inflation tube is inserted into a slot in the first sheet which connects the fluid line to the stopoff path.

For sandwich structures having more than three sheets, only one inflation tube is needed. The inflation tube is inserted in the core sheet nearest the fluid line in the forming die. Since fluid pressure is needed between each pair of sheets, additional apertures in the sheets are positioned and coupled with stopoff paths to provide the continuous fluid path.

The novel features which are believed to be characteristic of the invention, both as to the apparatus and forming method, together with further objects and advantages thereof, will be better understood from the following description in connection with the accompanying drawing in which the presently preferred embodiment of the invention is illustrated by way of example. It is to be expressly understood, however, that the drawing is for purposes of illustration and description only, and is not intended as a definition of the limits of the invention.

DETAILED DESCRIPTION OF THE INVENTION

Figure 1:
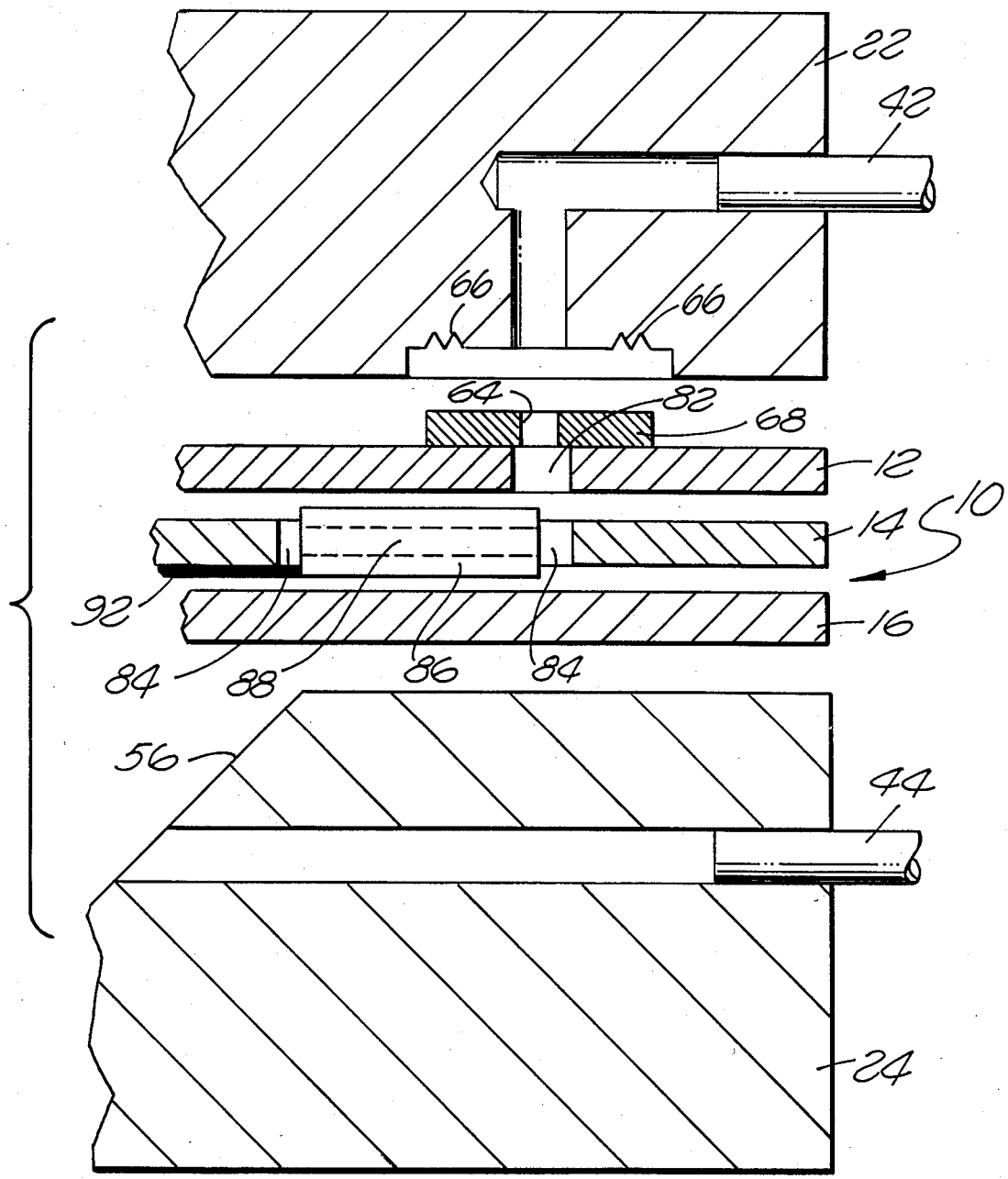
FIG. 1 is an enlarged cross sectional fragmentary view of a stack of worksheets in the forming apparatus prior to diffusion bonding and superplastic forming.

FIG. 1 illustrates an exploded cross-sectional view of the forming apparatus as applied to a three sheet sandwich structure. Although the sheets are shown separated from each other and from the forming dies in the drawing, this is for purposes of illustration only, and during diffusion bonding and superplastic forming, the sheets and the dies are all in intimate contact with each other.

The worksheets consist of core sheet 14 sandwiched between face sheets 12 and 16. The forming surfaces of die members 22 and 24 are shaped in accordance with the shape of the final sandwich structure: for example, a portion of face sheet 16 after forming will be inclined downward and positioned against die surface 56.

A fluid line 42 in upper die 22 allows fluid, preferably an inert gas such as argon, to flow into stack 10. During forming, circular seal 68 which has hole 64 therein, is secured between upper die 22 and upper face sheet 12. Circular grooves 66 are inserted into upper die 22 to secure a seal and prevent the inlet fluid from escaping into the tooling. The seal prevents surface contamination at elevated temperatures. Fluid line 44 in lower die 24 can be used to pull a vacuum during forming, as a vent, or to increase the pressure differential on the stack.

Core sheet 14 is coated in selected areas with a stopoff material, such as yttria, to prevent diffusion bonding, thereby forming stopoff path 92: for example, face sheet 16 will be diffusion bonded to core sheet 14 all along the common surfaces, except for the area contacting stopoff path 92.

A fluid path to the worksheets is required to provide the pressure differential required for diffusion bonding and superplastic forming. The inert gas enters through fluid line 42, through hole 64 in seal 68, through port 82 in face sheet 12, and into slot 84 in core sheet 14. An inflation tube 86 having internal bore 88 is inserted into slot 84. The primary purpose of inflation tube 86 is to prevent the closure of slot 84 during the diffusion bonding and superplastic forming stages. Inflation tube 86 may have more than one bore. The multiple bores allow for flexibility in both differential fluid pressure and tube strength, which can be adjusted for sophisticated applications.

To form the three sheet sandwich structure, it is recommended that two fluid paths be used, located at opposite sides of the stack. Each path includes a fluid line in a forming die, a port in the face sheet, and a slot with an inflation tube in the core sheet. Also, apertures in the core sheets (not shown) are used to improve circulation.

Ti-6Al-4V is the alloy generally preferred for diffusion bonding and superplastic forming. It is important that the material used for inflation tube 86 is compatible with the sheet material. Steel inflation tubes are not compatible with 6Al-4V titanium, since the titanium metallurgically combines with the nickel in the steel at elevated temperatures. A ceramic material made of alumina (aluminum oxide) is preferred; the alumina being stable and nonreactive relative to the Ti-6Al-4V alloy.

During diffusion bonding and superplastic forming the Ti-6Al-4V alloy is typically raised to temperatures of about 1700° F., and a pressure differential of about 300 psi is applied. To minimize distortion at these high temperatures, the die and the worksheets are tightly secured by applying pressures of about 1000 psi prior to forming, effectively restraining the stack. The die and the stack will expand at these elevated temperatures, creating high loads within the dies. The large clamping forces are needed to minimize slippage, to prevent the loss of the seal, and to assure that the assembly remains in tolerance.

An alumina inflation tube has a compressive strength of about 300,000 psi. This high strength assures that bore 88 in tube 86 will not close during diffusion bonding and superplastic forming pressures. In addition, when tube 86 is thicker than core sheet 14, the alumina has sufficient strength to depress surrounding face sheets 12 and 16 in the area surrounding tube 86. This avoids preforming corresponding grooves in sheets 12 and 16 (the preferred prior art practice to avoid crushing of the tube under clamping pressures).

Preferably, the bore diameter for a single bore tube is about 0.040 inches. If more volume of fluid is required in the stack, inflation tubes with more than one bore are used. It is preferred for most applications to use a double bore tube, with each bore being about 0.030 to 0.032 in diameter. The wall thickness of the inflation tube must be maintained to insure adequate compressive strength. The double bore tube provides a preferred combination of a high strength tube, while providing a hollow cross-sectional area for flow of the pressurized fluid.

Accordingly, there has been provided, in accordance with the invention, a forming apparatus and a forming method that fully satisfies the objectives set forth above.

It is understood that all terms used herein are descriptive rather than limiting. While the invention has been described in conjunction with specific embodiments, it is evident that many alternatives, modifications, and variations will be apparent to those skilled in the art in light of the disclosure herein. Accordingly, it is intended to include all such alternatives, modifications, and variations that fall within the spirit and scope of the appended claims.

What is claimed is:

1. An apparatus for forming laminate structures from a stack of at least two sheets with the application of pressurized fluid, a first sheet being made of a first sheet material, and a second sheet being made of a second sheet material which may be the same or different from said first sheet material, there being a slot in at least one of said sheets and a stopoff material selectively applied between the sheets to provide a stopoff path to various portions of the stack, which comprises:

a first and second forming members, said sheets being positioned between said forming members;

sealing means positioned between said first forming member and said first sheet;

a fluid line in said first forming member, the line being in fluid communication with said pressurized fluid, said slot, and said stopoff path; and an inflation tube made of a tube material that is noncontaminating relative to any adjacent sheet material, said inflation tube having an internal bore, said inflation tube being positioned within said slot, and said tube material having sufficient compressive strength relative to said sheet materials to prevent closure of said passage when said tube is subjected to subsequent pressures sufficient for diffusion bonding, and wherein said inflation tube has an outside diameter which is larger than the depth of the slot after application of diffusion bonding pressures and has sufficient compressive strength that said tube acts as a male die upon the application of diffusion bonding pressure whereby a groove is formed in at least one of said sheets without the slot into which said tube partially fits.

2. The apparatus of claim 1, wherein there are three sheets, the third sheet being made of a third sheet material, said third sheet material being the same or different from either of said first and second sheet materials.

3. The apparatus of claim 2, wherein said second sheet is sandwiched between said first sheet and said third sheet in said stack, said slot is in said second sheet, said first sheet having a port therethrough, and said port being in fluid communication with said fluid line.

4. The apparatus of claim 3, wherein said second sheet material is a superplastic metal.

5. The apparatus of claim 3, wherein all said sheets are of a superplastic metal.

6. The apparatus of claim 1, wherein said inflation tube has a compressive strength of at least about 3000 psi.

7. The apparatus of claim 1, wherein said inflation tube material is a ceramic.

8. The apparatus of claim 7, wherein said ceramic is substantially alumina.

9. The apparatus of claim 1, wherein said inflation tube has more than one bore.

10. The apparatus of claim 1, wherein said inflation tube is made of a ceramic material, said inflation tube having a compressive strength of at least about 3000 psi, and said inflation tube has more than one bore.

11. A method of making laminate structure between first and second forming members with the use of pressurized fluid from a first sheet made of a first sheet material and a second sheet made of a second sheet material, said second sheet material being the same or different from said first sheet material, which comprises:

positioning said first sheet and said second sheet into a stack;

applying a stopoff material at preselected areas of opposing surfaces of said sheets;

positioning said stack between said forming members;

providing a slot in one of said sheets at a predetermined position adjacent to said stopoff material;

providing a fluid line in said forming member that is coupled to said slot, said line allowing pressurized fluid to flow into said slot;

providing a ceramic inflation tube having an internal bore within said slot, said tube being thicker than said one of said sheets having the slot, said tube having a compressive strength of at least about 3000 psi, the compressive strength being sufficient to enable said tube to form a groove in at least one of the sheets with application of diffusion bonding pressures, a portion of said tube snugly fitting within the groove, said tube being positioned in said slot such that it provides fluid communication from said prssurized fluid to said stopoff material, said ceramic being noncontaminating relative to said first sheet material and said second sheet material;

sealing said first forming member about said slot; and applying heat and differential pressure to inflate said stack to form said laminate structure.

12. A method of claim 11, wherein said inflation tube has more than one bore.

13. A method of making a laminate structure between first and second forming members with the use of pressurized fluid from a first sheet made of a first sheet material and a second sheet made of a second sheet material, the second sheet material being the same or different from said first sheet material, comprising:

positioning the first sheet and the second sheet into a stack;

applying a stopoff material at preselected areas of opposing surfaces of the sheets;

positioning the stack between the forming members;

providing a slot in a portion of one of said sheets at a predetermined position adjacent to said stopoff material;

providing a fluid line in said forming member, said line being coupled to said slot to allow pressurized fluid to flow into said slot;

providing an alumina inflation tube within said slot, said tube being thicker than said one of said sheets having the slot, said tube having sufficient compressive strength to form a groove in at least one of the sheets upon the application of diffusion bonding pressures to at least portions of said sheets, a portion of said tube snugly fitting in the groove, said tube having more than one bore to enhance tube strength in order to resist construction of the tube upon the application of diffusion bonding pressures, said tube being positioned in the slot such that it provides fluid communication from the pressurized fluid to said stopoff material, said alumina being noncontaminating relative to said first sheet material and said second sheet material;

sealing said first forming member about said slot; and applying heat and differential pressure to inflate said stack to form the laminate structure.

* * * * *